US012435295B1

(12) United States Patent
Lan et al.

(10) Patent No.: US 12,435,295 B1
(45) Date of Patent: Oct. 7, 2025

(54) WATER-BASED ANTI-ODOR FABRIC TREATMENT COMPOSITIONS

(71) Applicant: SCIESSENT LLC, Beverly, MA (US)

(72) Inventors: Tian Lan, Chelsea, MA (US); Kenneth Johnson, Swampscott, MA (US)

(73) Assignee: SCIESSENT LLC, Beverly, MA (US)

( * ) Notice: Subject to any disclaimer, the term of this patent is extended or adjusted under 35 U.S.C. 154(b) by 537 days.

(21) Appl. No.: 17/987,810

(22) Filed: Nov. 15, 2022

Related U.S. Application Data

(60) Provisional application No. 63/279,252, filed on Nov. 15, 2021.

(51) Int. Cl.
*C11D 1/52* (2006.01)
*C11D 3/12* (2006.01)

(52) U.S. Cl.
CPC ................ *C11D 1/52* (2013.01); *C11D 3/124* (2013.01); *C11D 3/128* (2013.01)

(58) Field of Classification Search
CPC ............ C11D 1/52; C11D 3/124; C11D 3/128
See application file for complete search history.

(56) References Cited

U.S. PATENT DOCUMENTS

| | | | | |
|---|---|---|---|---|
| 4,151,148 A | 4/1979 | Chassin et al. | | |
| 5,790,987 A | 8/1998 | Sesselmann | | |
| 6,225,524 B1 | 5/2001 | Guarracino et al. | | |
| 6,376,741 B1 | 4/2002 | Guarracino et al. | | |
| 6,555,151 B2 | 4/2003 | Hu et al. | | |
| 9,421,294 B2 | 8/2016 | Yamada et al. | | |
| 2003/0109411 A1* | 6/2003 | Kilkenny | ............ | C11D 3/3746 510/438 |
| 2020/0172834 A1* | 6/2020 | Corona, III | ............ | C11D 3/349 |

FOREIGN PATENT DOCUMENTS

| | | |
|---|---|---|
| EP | 0501619 A1 | 10/1992 |
| JP | 2004052208 A | 2/2004 |
| WO | 91/11977 | 8/1991 |
| WO | 91/12029 | 8/1991 |
| WO | 91/12030 | 8/1991 |
| WO | 2007/113778 A2 | 10/2007 |

OTHER PUBLICATIONS

Yoo, Youngjae, Preparation of Acrylic Copolymers and Crosslinking Agents and Properties as Film, J. App. Polymer Sci., 112(3):1587-1594, May 2009 DOI: 10.1002/app.29564.
Frattarelli, D, et al., Holistic Management of Textile Odor Using Novel Silver-Polymeric Complexes, AATCC J. Research, vol. 5, No. 4, Jul./Aug. 2018 DOI: 10.14504/ajr.5.4.2.
Nippon Shokubai Co., Ltd., Epomin Polyment, Feb. 28, 2014.
Srivastava, S, Co-Polymerizations of Acrylates, Designed Monomers and Polymers, 12:1, 1-18 (2009) DOI: 10.1163/156855508X391103.

* cited by examiner

*Primary Examiner* — Brian A McCaig
(74) *Attorney, Agent, or Firm* — Hoffmann & Baron, LLP; Edward K Welch, II

(57) ABSTRACT

Various aqueous odor control treatment compositions for fibrous materials, especially fabrics and textiles, are described. The compositions include one or more aqueous cationic acrylic polymer emulsions and silica gel, alone or in combination with zeolite.

20 Claims, 1 Drawing Sheet

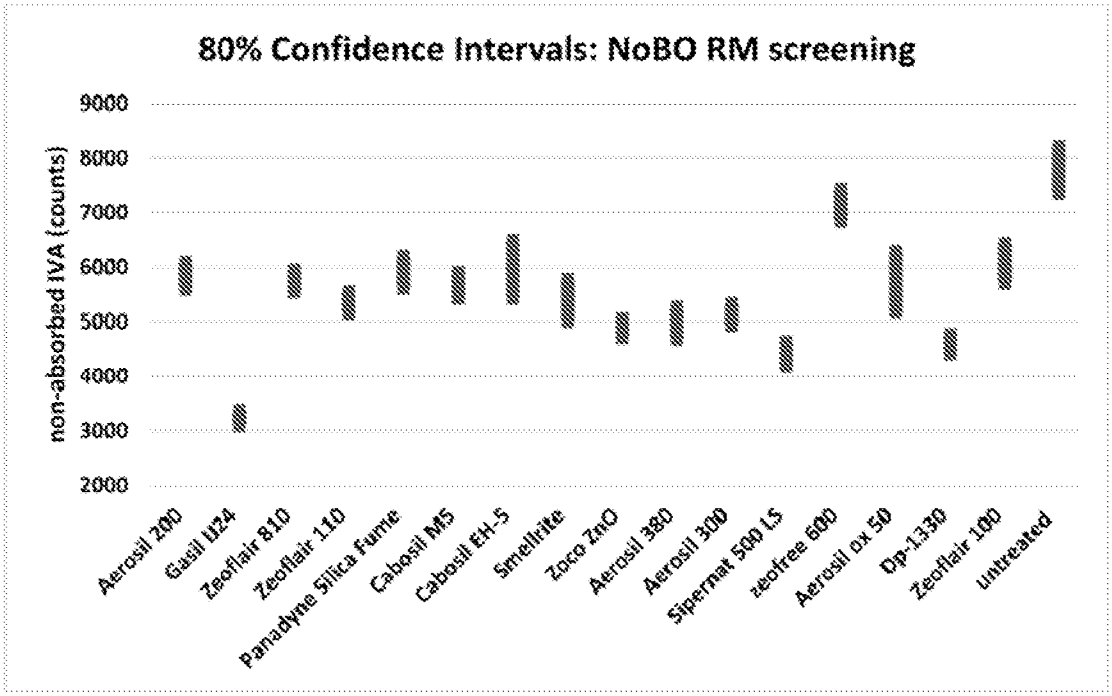
80% Confidence Intervals: NoBO RM screening
non-absorbed IVA (counts)
9000
8000
7000
6000
5000
4000
3000
2000
Aerosil 200
Gasil IJ24
Zeoflair 810
Zeoflair 110
Panadyne Silica Fume
Cabosil M5
Cabosil EH-5
Smellrite
Zoco ZnO
Aerosil 380
Aerosil 300
Sipernat 500 LS
zeofree 600
Aerosil ox 50
Dp-1330
Zeoflair 100
untreated

WATER-BASED ANTI-ODOR FABRIC TREATMENT COMPOSITIONS

RELATED APPLICATION

The present application claims the benefit of U.S. Provisional Patent Application No. 63/279,252 entitled "Water-Based Anti-Odor Fabric Treatment Compositions" filed on Nov. 15, 2021, the entire contents of which are hereby incorporated herein by reference.

FIELD OF THE INVENTION

The present teaching relates to fabric treatment compositions comprising select cationic acrylic polymer dispersions/emulsions and silica gel, alone or in combination with zeolite, for imparting renewable, durable and long-lasting odor control to fibrous materials, particularly textiles and fabrics, including non-woven fabrics, and articles of manufacture made therefrom. In particular, it relates to aqueous fabric treatment compositions for use in the OEM finishing of textiles and fabrics as well as in the post manufacture treatment of articles of manufacture of textiles and fabrics and, finally, the consumer application of the fabric treatment compositions to articles of manufacture as a spray or through laundering.

BACKGROUND

In recent years awareness of health and hygiene has increased whereby, in the fields of clothing, personal care, and housing, practical use is being made of products and techniques in which deodorant and antibacterial processing is employed. In particular, in the field of clothing and personal care products, various deodorant, antibacterial and antifungal processing techniques have been developed. Furthermore, such developments have also progressed in other areas such as household furnishings, accessories, and interiors.

The art is replete with descriptions of various odor controlling agents for use in various articles in order to address the problem of malodor formation and control. These agents can typically be classified according to the type of odor the agent is intended to combat. Odors may be classified as being acidic, basic or neutral. Acidic odor controlling agents have a pH greater than 7 and typically include inorganic carbonates, bicarbonates, phosphates and sulphates. Basic odor controlling agents have a pH of less than 7 and include compounds such as citric acid, boric acid and maleic acid. Neutral odor controlling agents have a pH of approximately 7 and include activated carbons, clays, zeolites, silicas and starches. Typically, these deodorants function by way of a neutralizing action; however, they tend to be odor type specific. For example, although acidic titanium oxide, aluminum sulphate and the like do show an effect in terms of deodorizing ammonia and other alkaline malodors, they tend to be ineffective against bad smells which are neutral or acidic. In the case of zinc oxide where the deodorant itself is a base material, while this will neutralize acidic malodors such methyl mercaptan and hydrogen sulfide and convert them into odorless materials, it is ineffective against neutral and basic malodors.

Prior art odor absorbers and control agents are disclosed in, for example, EP 348978 which discloses an absorbent article comprising an odor control system wherein the neutral odor controlling particles are selected from carbon, clays, silicas, zeolites and molecular sieves. Similarly, EP 510619 discloses absorbent articles comprising an odor control complex including a combination of at least 2 agents selected from a group which includes zeolites, aluminosilicates, and silica gels. Similarly, WO 91/12029, WO 91/11977 and WO 91/12030 disclose the combination of zeolites and absorbent gelling materials.

Carbon has been especially noted in the art as being particularly effective over a broad spectrum of odors. However, it is not favored due to its black appearance, which is considered unacceptable by consumers. Hence, a currently preferred odor control agent is zeolite. Although zeolites do not have a negative aesthetic profile, the main drawback is its lack of effective odor control over a broad range of odor types. U.S. Pat. No. 6,376,741 teaches an odor control system comprising a combination of zeolite and silica as a broader spectrum odor control agent.

Despite all the advances and improvements in odor control agent and systems, there is still a need for broad spectrum, durable, long-lasting odor control agents and systems. Most especially, those having enhanced odor control.

While the focus of deodorant development has long been focused on the specific odor control agents and combinations of such agents, it has now been found that the combination of silica gel, alone or in combination with zeolite, with select cationic acrylic polymer binders provides a remarkable enhanced and/or synergistic effect in odor control on fiber/fibrous materials, providing marked improvement in efficacy as well as excellent durability, most especially, long-term durability through multiple wash cycles.

SUMMARY OF THE INVENTION

It has now been found that an aqueous fabric treatment composition comprising (I) one or more cationic acrylic polymer emulsions/dispersions and (II) a water soluble or dispersible silica gel, alone or in combination with a zeolite, the "silica gel component." wherein the cationic acrylic polymer is self-cross-linking or, if not, the composition further comprises (III) a cross-linking agent, preferably an amine or amide cross-linking agent, for said cationic acrylic polymer, wherein the weight ratio of the solid/solid forming components of the composition (I:II) is from 1:25 to 25:1, preferably 1:15 to 15:1, more preferably from 1:10 to 10:1, most preferably 1:5 to 5:1, based on cationic acrylic polymer emulsions/dispersions having from 40 to 55% solids content is capable of providing enhanced, renewable, durable and/or long-lasting odor control to fibrous materials, particularly textiles and fabrics, including non-woven fabrics, and articles of manufacture made therefrom. When both a zeolite and a silica are present as the odor absorbing silica gel component (II) each is present in a weight ratio of from 15:1 to 1:15, preferably from 10:1 to 1:10, most preferably from 5:1 to 1:5. Selection of the silica gel is not believed critical, though preferred silica gels will have a relatively small particle size, narrow to medium pore size, and good viscosity profiles in water. The acrylic polymer emulsion/dispersion, which serves as the binder, must, however, be cationic and will preferably be an acrylic copolymer of two or more, preferably from two to four, low molecular weight alkyl acrylic ester and/or alkyl methacrylic ester monomers, wherein the alkyl group is a $C_1$ to $C_{12}$, preferably a $C_1$ to $C_{10}$, more preferably a $C_1$ to $C_6$, especially a $C_1$ to $C_4$, alkyl group, alone or further in combination with acrylic acid and/or methacrylic acid as well as low amounts of styrene. Preferably, the monomers of the acrylic copolymer emulsion/dispersion will include one or more $C_1$ to $C_4$ alkyl acrylic ester or alkyl methacrylic ester monomers: most preferably all monomers will be $C_1$ to $C_4$ alkyl acrylic ester or alkyl methacrylic ester monomers, alone or in combination with a cross-linking monomer, especially copolymerizable acrylamide monomers, most especially N-methylol acrylamide and N,N-dimethylol acrylamide. Additionally, such emulsions/dispersions may, and preferably do, include additional crosslinking agents, especially tertiary amines and/or quaternary amines, as further characterized herein.

Depending upon the use and method of application, additional water may be added to the compositions for ease of application to the fibrous materials so as to achieve a total solids/solids forming content of up to 70 wt %, preferably up to 50 wt %, more preferably up to 30 wt %, most preferably up to 10 wt %, provided that the loading is at least 0.01 wt %, preferably at least 0.05 wt percent, more preferably at least 1.0 wt. percent, most preferably at least 2.0 wt. percent: though for spray applications and certain other circumstances, the concentration may be as high as 70 wt percent. Additionally, depending upon the specific nature of the self-crosslinking functionality, co-reactants may also be present to promote and/or facilitate cross-linking.

The compositions of the present teaching do not require extensive processing and curing requirements whereby they may be applied by fabric and textile manufacturers and processors to bulk fabric or by OEM manufactures to articles of manufacture of fabrics and textiles or by consumers to articles of fabric and textiles, especially clothing, particularly in association with their home laundering.

The present teaching also pertains to a method of improving odor control and inhibition in fabrics and textiles said method comprising applying to the fabric or textile the above-mentioned aqueous fabric treatment compositions, especially those based on silica gel, alone or in combination with zeolite, and a tertiary amine containing cationic acrylic polymer emulsion, most especially a silica gel and a tertiary amine containing cationic acrylic polymer emulsion, wherein the rate of application is typically from 0.1% to 8%, preferably from 0.5% to 6%, more preferably from 1% to 5%, weight on the goods (owg).

DESCRIPTION OF THE DRAWINGS

FIG. 1 is a bar chart presenting the odor absorption efficacy results of Example 1's screening of the odor absorbing agents of Table 2.

DETAILED DESCRIPTION OF THE EMBODIMENTS

As used herein the term "(meth)acrylate" means the specified acrylate as well as the corresponding methacrylate. Also, the phrase "weight on the goods" and its acronym "owg" refers to the percent increase in weight of the treated fabric as opposed to the untreated fabric prior to drying of the treatment composition.

The present subject matter provides various compositions particularly adapted for application to fabrics and textiles as well as articles of manufacture made therefrom to impart odor control/anti-odor capabilities. In particular embodiments, the compositions can be applied as a surface coat, for example, by spraying, or, preferably, particularly with respect to the treatment of bulk and cut fabric and textiles as well as articles of manufacture that accommodate it, by padding, dipping, soaking, or flooding the fabric or textile with the composition or by exhaustion. The compositions may be used with fabrics and textiles of natural fibers, synthetic fibers or a blend of both natural and synthetic fiber, e.g., cotton/polyester blends: suitable fabrics include woven as well as non-woven fabrics.

The compositions according to the present teaching comprise (I) select cationic acrylic polymer emulsions/dispersions and (II) a water soluble or dispersible silica gel, alone or in combination with a zeolite, wherein the cationic acrylic polymer is self-cross-linking or, if not, the composition further comprises (III) a cross-linking agent, preferably an amine or amide cross-linking agent, for said cationic acrylic polymer, wherein the weight ratio of the solid/solid forming components of the composition (I:II) is from 1:25 to 25:1, preferably, 1:15 to 15:1, more preferably from 1:10 to 10:1, most preferably 1:5 to 5:1, based on cationic acrylic polymer emulsions/dispersions having from 40 to 55% solids content. These compositions are capable of providing enhanced, renewable, durable and/or long-lasting odor control to fibrous materials, particularly textiles and fabrics, including non-woven fabrics, and articles of manufacture made therefrom, particularly when they are applied to the fabric at a rate of from 0.1% to 8%, preferably from 0.5% to 6%, more preferably from 1% to 5%, weight on the goods (owg).

Silica gels are well known and widely available. Silica gel is a porous, amorphous form of silicon dioxide ($SiO_2$). Preferred silica gels are highly purified, having at least 90%, preferably 95%, more preferably 99% silicon dioxide. Most preferably, the silica gel is 100% silicon dioxide. It is believed that the selection of the silica gel is not critical and suitable silica gels may have a wide range of porosimetry properties. Specifically, no particular range of pore size, pore volume, pore diameter, particle size, surface area, pH are believed critical. Nonetheless, silica gels having pore volumes of from 0.5 to 3, preferably 1 to 2.5, cc/g; an average surface area of 100 to 800, preferably 200 to 500, $m^2/g$; an average pore size of from 5 Å to 300 Å, preferably from 10 Å to 130 Å; and/or an average particle size of 1 to 200 μm, preferably from 5 to 100 μm, more preferably 5 to 50 μm. pH is preferably in the range of 6.0 to 7.0, though more acidic, for example as low as 3.5, (pH based on 5% aqueous solution) as well as slightly basic, up to 10 pH, silica gels may be successfully employed, particularly for certain embodiments. Exemplary suitable silica gel materials include the silica gels sold under the trademark SYLOID by WR Grace and under the trademark GASIL by PQ Corporation.

The silica gels may be used alone or in combination with one or more zeolites. Zeolites are likewise well known and widely available. Suitable zeolites include natural and synthetic zeolites. Zeolites are aluminosilicates having a three dimensional skeletal structure that is represented by the formula: $XM_{2/n}O—Al_2O_3—YSiO_2—ZH_2O$ wherein M represents an ion-exchangeable ion, generally a monovalent or divalent metal ion; n represents the atomic valency of the (metal) ion; X and Y represent coefficients of metal oxide and silica, respectively; and Z represents the number of water of crystallization. Examples of such zeolites include A-type zeolites, X-type zeolites, Y-type zeolites, T-type zeolites, high-silica zeolites, sodalite, mordenite, analcite, clinoptilolite, chabazite and erionite. Typically, the surface area of these zeolites is at least 150 $m^2/g$ (anhydrous zeolite as standard) and the $SiO_2/Al_2O_3$ mole ratio is preferably less than 14 and more preferably less than 11. The ion-exchange capacities of these zeolites are as follows: A-type zeolite=7 meq/g; X-type zeolite=6.4 meq/g; Y-type zeolite=5 meq/g; T-type zeolite=3.4 meq/g; sodalite=11.5 meq/g; mordenite=2.6 meq/g; analcite=5 meq/g; clinoptilolite=2.6 meq/g; chabazite=5 meq/9; and erionite=3.8 meq/g. The present invention is not, however, limited to the foregoing zeolites. When both a zeolite and a silica are present as the odor absorbing component (II) each is present in a weight ratio of from 15:1 to 1:15, preferably from 10:1 to 1:10, most preferably from 5:1 to 1:5.

The second, critical component of the compositions of the present teaching is the cross-linkable acrylic polymer emulsion/dispersion, preferably a self-crosslinking polymer. Suitable acrylic polymer emulsions/dispersions, which serves as the binder, must be cationic and will preferably be an acrylic copolymer of two or more, preferably from two to four, low molecular weight alkyl acrylic ester and/or alkyl methacrylic ester monomers, wherein the alkyl group is a $C_1$ to $C_{12}$, preferably a $C_1$ to $C_{10}$, more preferably a $C_1$ to $C_6$, especially those including at least one $C_1$ to $C_4$, alkyl group, alone or further in combination with acrylic acid and/or methacrylic acid as well as low amounts of styrene. Preferably, the monomers of the acrylic copolymer emulsion/dispersion will include one or more $C_1$ to $C_4$ alkyl acrylic ester and/or alkyl methacrylic ester monomers, alone or in combination with one or more higher, preferably one or more $C_1$ to $C_{10}$, more preferably one or more $C_1$ to $C_6$ acrylic ester and/or methacrylic ester co-monomers. Most preferably, all the alkyl acrylate monomers are C1 to C4 monomers. Exemplary monomers include methy (meth)acrylate, ethyl (meth) acrylate, butyl (meth)acrylate, hexyl (meth)acrylate, isodecyl (meth)acrylate, octyl (meth)acrylate and the like; especially preferred monomers are methyl acrylate, methyl methacrylate and butyl acrylate and combinations of any two or all three thereof.

Especially preferred cationic acrylic emulsions/dispersions are those that are characterized as self-crosslinking and having or including various cross-linkable functional groups as terminal reactive groups and/or pendant reactive groups, which groups may be imparted to the copolymers by substitution/reaction with existing reactive groups and/or, most preferably, as functional moieties of comonomers which are incorporated into the resulting polymer chain whereby the cross-linking moiety is present as terminal groups to the resulting chain and/or as pendant groups to the resulting polymer chains. While di- and poly-functional (meth)acrylates such as polyethylene glycol di(meth)acrylates, triethylene glycol di(meth)acrylates, and ethylene glycol di(meth) acrylates and the like, may be used as cross-linking monomers, especially preferred self-crosslinking cationic acrylic emulsions are those based upon co-polymerizable low molecular weight tertiary and/or quaternary amines, especially tertiary amines, including, in particular cross-linking acrylamides, most especially, one or more low molecular alkylol acrylamides or alkoxyalkyl acrylamides. Suitable cross-linking comonomers include dimethyl aminoethyl methacrylate, N-(isobutoxymethyl) acrylamide, N,N'-methylene bisacrylamide, N-methylol acrylamide (NMA), N,N-dimethylol acrylamide, N-butylol acrylamide, [2-(acryloxy)ethyl]-trimethylammonium chloride, [2-(methacryloloxy)ethyl]trimethylammonium chloride, [2-(methacryloxy)ethyl]trimethyl-ammonium chloride, (3-acrylamidopropyl)trimethyl-ammonium chloride, N,N-dimethylaminoethyl (meth)acrylate, butylamino (meth) acrylate, and t-butylaminoethyl (meth)acrylate. Additional acrylamide cross-liking monomers are presented in U.S. Pat. No. 4,151,148, the contents of which are hereby incorporated herein by reference. Especially preferred self-crosslinking cationic acrylic polymer emulsions/dispersions are those based upon methyl acrylate, methyl methacrylate and/or butyl acrylate and combinations of any two or all three thereof together an acrylamide, especially N-methylol acrylamide or N,N-dimethylol acrylamine, alone or further in combination with one or more additional cross-linking agents, especially a tertiary amine and/or a quaternary amine.

Where the cross-linking group is imparted by substitution/reaction with the polymer chain, preferred cationic acrylic copolymers are those wherein up to 30%, more preferably up to 15%, e.g., up to 6%, preferably up to 8%, and at least 0.5%, preferably at least 1.0%, more preferably at least 2.0% of the monomer units have such substitution, especially where said substitution is an amine substitution which arises from amination with ethyleneimine, polyethyleneimine, tertiary amines, and the like, especially acrylamides. Where the cross-linking group is incorporated into the polymer chain by copolymerization, preferred cationic acrylic copolymers include those which have up to 30%, most preferably up to 15%, e.g., up to 6%, preferably up to 8%, by weight amine, preferably acrylamide, monomer content and preferably at least 0.5%, preferably at least 1.0%, more preferably at least 2.0% by weight amine monomer content, which amine may be wholly or partly quaternized. As well recognized by those skilled in the art, the exact level of cross-linker or cross-linking monomer is depended upon the degree of cross-linking desired in the final product. Amine substitution and quaternization of acrylic copolymers is well known, having been described in, e.g., U.S. Pat. Nos. 3,170,901; 3,171,805; 3,414,513; 3,758,445; 3,780,092; 2,897,101; 2,923,653; 3,517,562; 3,776,810; 3,812,067; 3,255,139; 3,288,740; 3,374,789; 3,652,478 and 3,799,910: the contents of which are hereby incorporated by reference in their entirety. In the absence of said acrylamide co-monomers and/or amine substitution, or in additional thereto, the composition will also include one or more typical amine cross-linking agents: most typically the same amines used in modifying the acrylic polymers as noted previously, especially tertiary amines. Again, the level of such cross-linking agents will be sufficient to achieve the desired degree of cross-linking, typically that which would achieve up to 8%, preferably up to 6% substitution on the acrylic polymer. While cationic acrylic polymer emulsions are widely available, especially preferred are those sold under the RayCat® brand from Specialty Polymers, Inc.

The compositions typically comprise from 0.5 to 30, preferably from 2 to 25, more preferably from 5 to 20, wt percent (wt %) of the silica gel component (II), and from 3 to 70, preferably 5 to 50 wt % of the cationic acrylic polymer emulsion (I) (based on solids content of from 40 to 55%; otherwise, the amount may be more or less depending upon a lower or higher solids content, respectively). As noted, the weight ratio of the acrylic polymer emulsion to the silica gel component (I:II) is from 1:15 to 15:1, preferably from 1:10 to 10:1, most preferably 1:5 to 5:1, based upon the solids/solids forming components of each.

Furthermore, additional water may be added to the compositions or to the mixture as the composition is being formed in order to provide a suitable viscosity for application to the fabric or textile depending upon the method of application and the rate of application. Generally speaking, the solids/solids forming concentration of the fabric treatment composition will be from 0.1 to 70 wt. percent, preferably 1 to 60 wt. percent, most preferably, from 2 to 50 wt. percent. Again, the specific concentration will depend, in part, on how it is to be applied, when it is to be applied and who is doing the application. Depending upon the specific circumstances, the solids/solids forming concentration of the fabric treatment composition may be from 0.1 to 50 wt percent, preferably from 1 to 30 wt percent, most preferably from 2 to 10 wt percent. For example, in the case of bulk fabric or textile treatment of bulk treatment of articles of manufacture, such as clothing, drapes, bedding, and the like, concentrations of from 0.1 to 70, preferably 0.5 to 50 wt, percent may be acceptable. On the other hand, for a post manufacture treatment to be applied to an article of manufacture that is not capable of bulk treatment, e.g., an upholstered chair, couch or the like, a lower solids content may be desired, for instance, the concentration may be from 0.1 to 25 wt percent, preferably from 0.5 to 10 wt percent. Similarly, a consumer spray-on composition may likewise perform best at lower concentrations as well. In any event, it is particularly desirable to achieve a loading of from 0.1% to 8% preferably from 0.5% to 6%, more preferably from 1% to 5%, owg.

In addition to the critical ingredients noted above, the compositions according to the present teaching may and, typically will, include any number of conventional additives for the treatment of fibrous materials, particularly fabrics and textiles, including, but not limited to, pH adjusters, defoamers, thickening agents, and dispersing and wetting agents, All such additives will be used in their conventional quantities: though exact levels of use will be found by simple formulation work to identify those levels that address/provide the particular issues/results sought, respectively. For example, thickeners will typically be present in the formulation at levels of 0.05 to 5 wt %, dispersing/wetting agents at 0.05 to 20 wt % and the like.

The compositions of the present teaching do not require extensive processing to manufacture and are prepared by simply blending the ingredients to form the desired end-product. Similarly, the compositions of the present teaching do not require extensive processing and curing requirements. The compositions of the present teaching may be applied by any known and appropriate method for the fabric or textile or article of manufacture to be treated. For example, fabric and textile manufacturers and processors may apply the compositions to the bulk fabric, OEM manufacturers may apply the composition to the fabrics prior to or post cutting or to the articles of manufacture made therefrom. Additionally, consumers and commercial launderers can apply the compositions in conjunction with their laundering efforts. Application itself may be by an method appropriate for the specific application/use contemplated. For example, bulk fabric and textile as well as articles of manufacture made therefrom such as clothing, drapes, bedding and the like, may be treated by pad, exhaustion, coating, immersion, soaking, dipping, spraying, drenching (i.e., pass through a waterfall of the composition), and the like. Otherwise, particularly with respect to articles of manufacture that incorporate other components or materials that do not accommodate complete treatment, e.g., upholstered chairs, couches, pillows and the like, the article may be sprayed or misted. Additionally, the articles of manufacture, particularly clothing, bedding and the like can be treated during laundering by the addition of the composition to the washing machine like a fabric softener.

Having described the aqueous compositions and their use, attention is now drawn to the following examples exemplifying various compositions and comparative compositions and their odor control/anti-odor efficacy. In the examples, with the exception of Example 1, the following general process was prepared for the preparation of the coating compositions:

Water, preferably deionized water, though not required, was added to a mixing vessel and mixing started at a medium to high speed. The silica gel component, in powder form, powder was slowly added by sprinkling into the water with continued mixing for approximately 10 to 45 minutes or until the powder was completely broken up and fully dispersed in the water. If indicated, a thickener was added and the mixture subjected to continued mixing until the thicker is completely dissolved or dispersed. If necessary, the mixing speed was increased to compensate for any spike in the viscosity of the mixture due to the addition of thickener. In the case of cationic thickeners, glacial acetic acid was added and the mixture mixed for another 10 to 15 minutes. At this point, the binder materials, in the case of the inventive compositions, the cationic acrylic polymers, were slowly added with mixing and mixing maintained until the mixture is completely homogenous. If designated, other ingredients such as additional dispersing agents, wicking agents, softeners, or preservatives were then added as desired or needed. The mixture was continually mixed for another 10 to 30 minutes until or to ensure that a homogeneous formulation was achieved.

The compositions and comparative compositions were applied to fabric samples measuring approximately 300 mm bx 210 mm (sized to fit the lab padder) by the padding method. The pad bath solution was prepared by first determining the wet pick-up characteristics of the fabric and then calculating the concentration of the coating compositions needed for testing. Once determined, the appropriate amount of water was added to a beaker followed by the calculated quantity of the coating composition with mixing. Mixing continued for several minutes until the coating composition was completely dispersed in the water. The so formed pad bath was then poured into the pad trough and the padding machine started. The fabric samples were then impregnated by padding, run through the nip of the pad roller and mounted on the stenter frame of the dryer. Immediately, the fabric was pushed into the dryer set at 150° C. for approximately 3 minutes, or such other temperature and time as was needed. The treated fabric samples were then subjected to multiple washing cycles as noted and the sample tested to determine the odor control performance of the fabric according to ISO 17299-3 for isovaleric acid (IVA) or ISO 17299-2 for ammonia reduction: each coating composition run in triplicate.

The following table, Table 1, sets for the ingredients/materials employed in preparing the coating composition, both according to the present teaching and comparative compositions:

TABLE 1

| Ingredient | Identify | Purpose | Manufacturer |
|---|---|---|---|
| DI | Deionized water | | |
| Xanthum Gum | | Nonionic thickener | |
| N-Hance CG17 | High MW guar gum | cationic thickener | Ashland |
| N-Hance HPCG 1000 | Low MW guar gum | cationic thickener | Ashland |
| GAA | Glacial acetic acid | pH modifier | |

TABLE 1-continued

| Ingredient | Identify | Purpose | Manufacturer |
|---|---|---|---|
| Gasil ® HP260 | Silica gel | Odor absorber | PQ Corporation |
| Gasil ® IJ24 | Silica gel | Odor absorber | PQ Corporation |
| Smellrite | Zeolite | Odor absorber | Honeywell UOP |
| CZH10N | Zeolite | Odor absorber | Sinanen Zeomic Co. |
| Surfynol ® MD20 | Gemini surfactant | Defoamer | Evonik |
| Surfynol ® DF 62 | Gemini surfactant | Defoamer | Evonik |
| Tergitol S-15-5 | Secondary alcohol ethoxylate | Dispersing and wetting agent | Dow |
| Tergitol S-15-9 | Secondary alcohol ethoxylate | Dispersing and wetting agent | Dow |
| Ethox TAM-20 | Ethyoxylated fatty amine | Dispersing and wetting agent | Ethox |
| Mirapol ® A-15 | Polyquarternium-2 | Cationic co-binder | Solvay Novecare |
| Proxel GXL | 2-benzisothiazolin-3-one | Preservative | Lonza |
| Binder A | non-cationic lower alkyl (meth)acrylate copolymer | Acrylic Binder | Specialy Polymers, Inc. |
| Binder 1 | Butyl acrylate, methyl meth-acrylate, N-methylol acryl-amide copolymer with ~2% quaternized aminoalkyl (meth)acrylate functional groups | Cationic binder | |
| Binder 2 | Butyl acrylate, methyl methacrylate, N-methylol acrylamide copolymer copolymer with ~2% tertiary aminoalkyl (meth)acrylate functional groups | Cationic binder | |
| Binder 3 | Butyl acrylate, methyl methacrylate, N-methylol acrylamide copolymer copolymer with ~6% tertiary aminoalkyl (meth)acrylate functional groups | Cationic binder | |
| Binder 4 | Butyl acrylate, methyl acrylate, methyl methacrylate, N-methylol acrylamide copolymer copolymer with ~2% quaternized aminoalkyl (meth)acrylate functional groups | Cationic binder | |
| Binder 5 | Butyl acrylate, methyl methacrylate, N-methylol acrylamide copolymer copolymer with ~15% tertiary amino alkyl (meth)acrylate functional groups | Cationic binder | |

Example 1—Odor Absorber Screening

A series of pad bath formulations comprising 0.8 wt % cationic acrylic polymer emulsion and 0.4 wt % of each of the known odor absorbing additives set forth in Table 2 were combined with deionized water and mixed until a homogeneous solution was attained and then added to the pad bath. The fabric was found to have a wet pick up of around 100%. Following treatment, the treated fabric samples were washed 25 times and evaluated for odor control according to ISO 17299-3 for IVA. The results are presented in FIG. 1. All of the odor absorbing agents provided some level of odor absorption as compared to the untreated sample: mostly a similar level of absorption. However, surprisingly, the silica gel, alone or in combination with the zeolite, in combination with the cationic acrylic polymer provided a marked improvement in odor reduction as compared to all the other odor absorbers even after 25 home launderings. While silica gels are known odor absorbers, their effectiveness is generally very similar to that of other well-known commercial odor absorbers such as Smellrite™ zeolite; however, again, surprising efficacy was found when use in combination with cationic acrylic copolymer binders.

Example 2—Formulation Comparison

Having observed the unexpected, marked improved efficacy of the silica gel as compared to the other known odor absorbers, a series of full odor control formulations were prepared comparing the silica gel and the combination of silica gel and zeolite to the Smellrite™ zeolite, a very popular commercial odor control agent, as well as different binders. Six formulations were prepared as set forth in Table 3. Each formulation was applied to 100% black polyester knit fabric swatches to provide a loading of 2.5% owg and subjected to 25 home washings. The results are also presented in Table 3.

TABLE 2

| Supplier | Product | Material Type | Particle Size µm (D90) |
|---|---|---|---|
| Evonik | Aerosil ® 50 | Fumed silica | 0.4 |
| Evonik | Aerosil ® 200 | Fumed silica | 58 |
| Evonik | Aerosil ® 300 | Fumed silica | 72 |
| Evonik | Aerosil ® 380 | Fumed silica | 85 |
| Evonik | Sipernat ® 500LS | Precipitated silica | 17 |
| Evonik | Zeofree ® 600 | Precipitated silica | 40 |
| Evonik | DP 1330 | Precipitated silica | 25 |
| UOP | Smellrite ™ | Aluminosilicate | |
| PQ | Gasil ® IJ24 | Silica Gel | 10.4 |
| Zeochem | Zeoflair ® 810 | Aluminosilicate | 22 |
| Zeochem | Zeoflair ® 110 | Aluminosilicate | 7.5 |
| Zeochem | Zeoflair ® 100 | Aluminosilicate | 324 |
| Zeochem | ZOCO ® | Zinc oxide | |
| Panadyne | Silica Fume | Fumed silica | |
| Cabot | Cabosil ® M5 | Fumed silica | 75 |
| Cabot | Cabosil ® EH-5 | Fumed silica | 109 |

As seen in Table 3, Formulation A employing the anionic acrylic binder, Binder A, performed marginally well whereas Formulations B, C and F employing cationic acrylic binders having approximately 2% to 15% tertiary amine, quaternized and non-quaternized, respectively, performed remarkably well, with near total elimination of the odorous agent. Formulation E, like Formulation A, performed marginally well; however, this formulation included a polyquaternium co-binder, which may have adversely affected the odor reduction properties. Further, Formulation D failed to provide a satisfactory odor reduction. Though the binder had a slightly higher level of tertiary amine functional groups, the significant difference was that this formulation employed the Smellrite® zeolite odor absorbing agent. The possibility exists that the binder interferes with the odor absorbing capability of the zeolite: though, as found in the subsequent examples, the cationic acrylic binders appear to have provided an odor control synergy with the silica gel. Finally, the same synergy was found where a combination of silica gel and zeolite was employed as the odor absorbing component (Formulation F): indeed, an additional synergy was noted as high level of efficacy was realized even though the total amount of the silica gel and zeolite was considerably less than in the other examples.

TABLE 3

| | Formulation A | Formulation B | Formulation C | Formulation D | Formulation E | Formulation F |
|---|---|---|---|---|---|---|
| DI water | 56.93 | 56.68 | 56.78 | 64.5 | 51.98 | 20.4 |
| Xanthan Gum | 0.3 | | | 0.3 | | |
| N-Hance ® CG 17 | | 0.3 | | | 0.3 | |
| N-Hance ® HPCG 1000 | | | 0.5 | | | |
| Acetic acid glacial | | 0.95 | | | 0.95 | 0.7 |
| Gasil ® IJ24 | 10 | 10 | 10 | | 10 | 2 |
| Smellrite | | | | 3.3 | | |
| CZH10N | | | | | | 2 |
| Surfynol ® MD-20 | 0.95 | 0.95 | | 0.95 | 0.95 | 4 |
| Surfynol ® DF-62 | | | | | | 0.6 |
| Tergitol ® S-15-5 | | | 0.95 | | | |
| Tergitol ® 5-15-9 | 1.00 | 0.3 | 0.95 | 0.95 | | |
| Ethox TAM-20 (40%) | | | | | | 10 |
| propylene glycol | 0.82 | 0.82 | 0.82 | | 0.82 | |
| Mirapol ® A-15 | | | | | 5 | |
| Proxel GXL | | | | | | 0.3 |
| Binder A | 30 | | | | | |
| Binder 1 | | 30 | | | | |
| Binder 2 | | | 30 | | | |
| Binder 3 | | | | 30 | | |
| Binder 4 | | | | | 30 | |
| Binder 5 | | | | | | 60 |
| Total (wt %) | 100 | 100 | 100 | 100 | 100 | 100 |
| IVA Odor reduction % | 78 | 91 | 97 | 60 | 78 | 90 |

Example 3—Binder v Silica Gel

Following on the findings of the earlier studies a further study was performed to assess whether the marked improvement seen with the silica gel was actually due to the silica gel itself or whether the binder played a role in its marked performance. The formulations tested and the results attained therewith were as shown in Table 4. The treated swatches were subjected to 30 wash cycles before testing according to ISO 17299-3.

TABLE 4

| Formulation | Ingredients | Loading (% owg) | IVA reduction % |
|---|---|---|---|
| Formulation G | Gasil ® IJ24 | 0.25 | 92 |
| | Binder 3 | 1 | |
| | GAA | 0.1 | |
| Formulation H | Gasil ® IJ24 | 1.25 | 67 |
| | GAA | 0.1 | |
| Formulation 1 | Binder 3 | 1.25 | 85 |
| | GAA | 0.1 | |

As seen in Table 4, the cationic acrylic polymer binder itself manifested a significant odor control capability; however, more remarkable and unexpected was the synergistic odor control realized with the combination of the cationic acrylic polymer binder and silica gel. Furthermore, given the efficacy of the binder itself and the results shown in FIG. 1 and in Formulation D, above, it is clear that the synergy is unique and specific to the silica gels and the combination thereof with zeolite.

Example 4—Formulation Variation

A series of pad bath formulations according to the present teaching were prepared varying the silica gel and the weight ratios of the cationic acrylic polymer binders and/or the silica gels. The 100% black polyester knit fabric was then treated with these formulations and the results attained therewith are presented in Table 5. The treated swatches were subjected to 20 wash cycles before testing.

As seen in Table 5, the formulations according to the present teaching all demonstrated remarkable results, showing high efficacy in odor control as well as durability and longevity.

TABLE 5

| Formulation | Ingredient | Loading (% owg) | IVA reduction % |
|---|---|---|---|
| Formulation J | DI | | 96 |
| | Gasil ® IJ24 | 0.25 | |
| | Binder 4 | 0.5 | |

TABLE 5-continued

| Formulation | Ingredient | Loading (% owg) | IVA reduction % |
|---|---|---|---|
| | Binder 3 | 0.25 | |
| | GAA | 0.01 | |
| Formulation K | DI | | 97 |
| | Gasil ® IJ24 | 0.25 | |
| | Binder 4 | 0.375 | |
| | Binder 3 | 0.375 | |
| | GAA | 0.01 | |
| Formulation L | DI | | 98 |
| | Gasil ® IJ24 | 0.25 | |
| | Binder 4 | 0.2 | |
| | Binder 3 | 0.55 | |
| | GAA | 0.01 | |
| Formulation M | DI | | 96 |
| | Gasil ® IJ24 | 0.125 | |
| | Binder 4 | 0.2 | |
| | Binder 3 | 0.55 | |
| | GAA | 0.01 | |
| Formulation N | DI | | 94 |
| | Gasil ® IJ24 | 0.0625 | |
| | Binder 4 | 0.2 | |
| | Binder 3 | 0.55 | |
| | GAA | 0.01 | |
| Formulation O | DI | 1.5% | 87 |
| | Gasil ® HP260 | | |
| | Binder 4 | | |
| | Binder 3 | | |

Without further elaboration, it is believed that one skilled in the art, using the preceding description, can utilize the teachings set forth herein to its fullest extent and, without departing from the spirit and scope thereof, can make various changes and modifications of the invention to adapt it to various usages and conditions. The preceding preferred specific embodiments are, therefore, to be construed as merely illustrative, and not limitative of the remainder of the disclosure in any way whatsoever.

What is claimed is:

1. An aqueous fabric treatment composition comprising (I) one or more cationic acrylic polymer emulsions/dispersions and (II) a water soluble or dispersible silica gel, alone or in combination with a zeolite, wherein the cationic acrylic polymer is self-cross-linking or, if not, the composition further comprises (III) a suitable cross-linking agent for the cationic acrylic polymer, each of (I) and (II) being or including solid and/or solid forming components, wherein the weight ratio of the solid/solid forming components of the composition (I:II) is from 1:25 to 25:1, based on cationic acrylic polymer emulsions/dispersions having from 40 to 55% solids content.

2. The composition of claim 1 wherein the weight ratio of the solid/solid forming components of the composition (I:II) is from 1:15 to 15:1.

3. The composition of claim 1 wherein the weight ratio of the solid/solid forming components of the composition (I:II) is from 1:5 to 5:1.

4. The composition of claim 1 wherein both the silica gel and a zeolite are present and the weight ratio of silica gel to zeolite is from 15:1 to 1:15.

5. The composition of claim 1 wherein both the silica gel and a zeolite are present and the weight ratio of silica gel to zeolite is from 5:1 to 1:5.

6. The composition of claim 1 wherein the cationic acrylic polymer emulsion or dispersion comprises one or more (meth)acrylic ester monomers, alone or in combination with acrylic or methacrylic acid.

7. The composition of claim 6 wherein the one or more (meth)acrylic ester monomers are $C_1$ to $C_{12}$ (meth)acrylic ester monomers.

8. The composition of claim 6 wherein the one or more (meth)acrylic ester monomers are or include at least one $C_1$ to $C_4$ (meth)acrylic ester monomer.

9. The composition of claim 1 wherein the one or more cationic acrylic polymer emulsions/dispersions is self-cross-linking and includes as comonomers or as co-reactants one or more di- or tri-(meth)acrylates and/or amino, glycol or polyol substituted di- or tri-(meth)acrylates; one or more tertiary amines and/or quaternary amines; one or more low molecular weight acrylamides, alkylol acrylamides, and/or alkoxyalkyl acrylamides; ethylenimine or polyethylenimine.

10. The composition of claim 9 wherein the comonomers or co-reactants are present in an amount of at least 0.1% by weight and up to 30% by weight.

11. The composition of claim 9 wherein the co-monomer or co-reactant is N-methylol acrylamide.

12. A method of imparting odor control and inhibition to fabrics and textiles said method comprising applying to the fabric or textile an odor controlling effective amount of an aqueous fabric treatment composition comprising (1) one or more cationic acrylic polymer emulsions/dispersions and (II) a water soluble or dispersible silica gel, alone or in combination with a zeolite, wherein the cationic acrylic polymer is self-cross-linking or, if not, the composition further comprises (III) a suitable cross-linking agent for the cationic acrylic polymer, each of (I) and (II) being or including solid and/or solid forming components, wherein the weight ratio of the solid/solid forming components of the composition (I:II) is from 1:25 to 25:1, based on cationic acrylic polymer emulsions/dispersions having from 40 to 55% solids content.

13. The method of claim 12 wherein the composition is applied at a rate of 0.1 to 8 percent weight on goods (owg).

14. The method of claim 12 wherein the composition is applied to bulk fabric or textile.

15. The method of claim 12 wherein the composition is applied to fabric or textile of manufactured goods.

16. The method of claim 12 wherein the cationic acrylic polymer emulsion or dispersion comprises one or more (meth)acrylic ester monomers, alone or in combination with acrylic or methacrylic acid.

17. The method of claim 16 wherein the (meth)acrylic ester monomers are or include at least one $C_1$ to $C_4$ (meth) acrylic ester monomer.

18. The composition of claim 12 wherein the one or more cationic acrylic polymer emulsions/dispersions is self-cross-linking and includes as comonomers or as co-reactants one or more di- or tri-(meth)acrylates and/or amino, glycol or polyol substituted di- or tri-(meth)acrylates; one or more tertiary amines and/or quaternary amines; one or more low molecular weight acrylamides, alkylol acrylamides, and/or alkoxyalkyl acrylamides; ethylenimine or polyethylenimine.

19. The composition of claim 18 wherein the comonomers or co-reactants are present in an amount of at least 0.1% by weight and up to 30% by weight.

20. The composition of claim 18 wherein the comonomer or co-reactant is N-methylol acrylamide.

* * * * *